United States Patent [19]
Hall

[11] Patent Number: 5,897,138
[45] Date of Patent: Apr. 27, 1999

[54] VEHICLE BALLAST RECEPTACLE

[76] Inventor: William M. Hall, 204 Hill-N-Dale La., Cleveland, N.C. 27013

[21] Appl. No.: 08/867,951

[22] Filed: Jun. 3, 1997

[51] Int. Cl.⁶ ..................................................... B60R 27/00
[52] U.S. Cl. ........................................... 280/759; 296/37.6
[58] Field of Search ..................... 280/759, 758, 280/757; 296/39.2, 37.6

[56] References Cited

U.S. PATENT DOCUMENTS

| | | | |
|---|---|---|---|
| 2,993,721 | 7/1961 | Bowman | 280/759 |
| 3,727,971 | 4/1973 | Sisler | 296/37 |
| 4,190,281 | 2/1980 | Chandler | 296/37.6 |
| 4,796,914 | 1/1989 | Raynor | 280/759 |
| 5,494,315 | 2/1996 | Heltenburg | 280/759 |
| 5,657,916 | 8/1997 | Tackett | 280/757 |

*Primary Examiner*—Paul N. Dickson

[57] ABSTRACT

A ballast receptacle is provided to increase the load on the rear wheels of a vehicle such as a pick-up truck. The receptacle includes a container formed from a plastic material such as vinyl and can be filled with water to increase the vehicle's traction on slick surfaces such as ice or mud covered roads. The ballast receptacle is positioned laterally at the rear of the vehicle bed and is releasably anchored by flexible straps to each side of the vehicle.

6 Claims, 3 Drawing Sheets

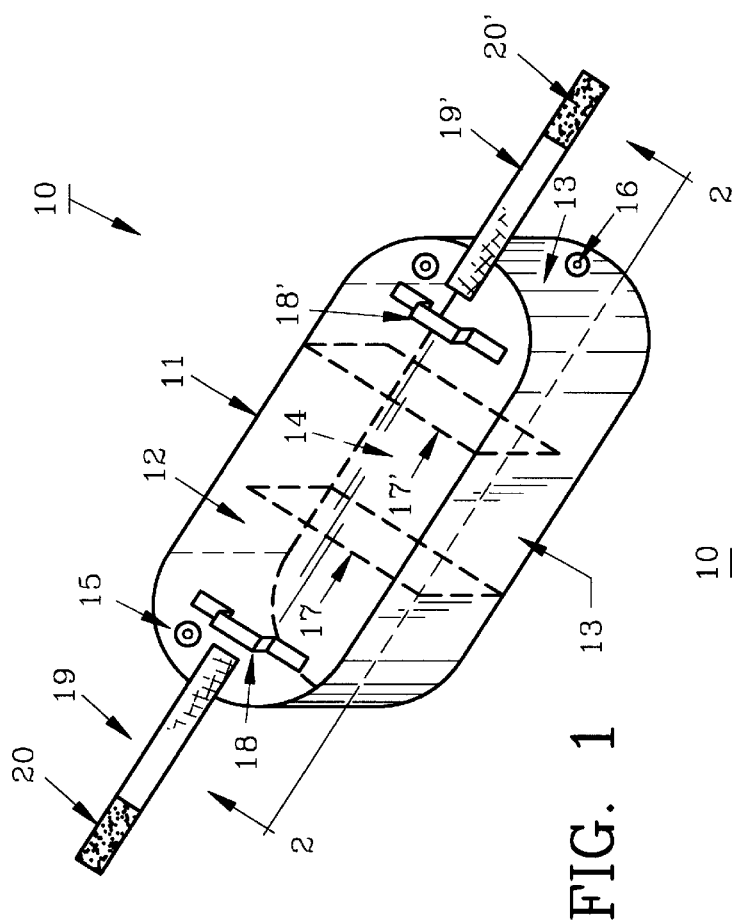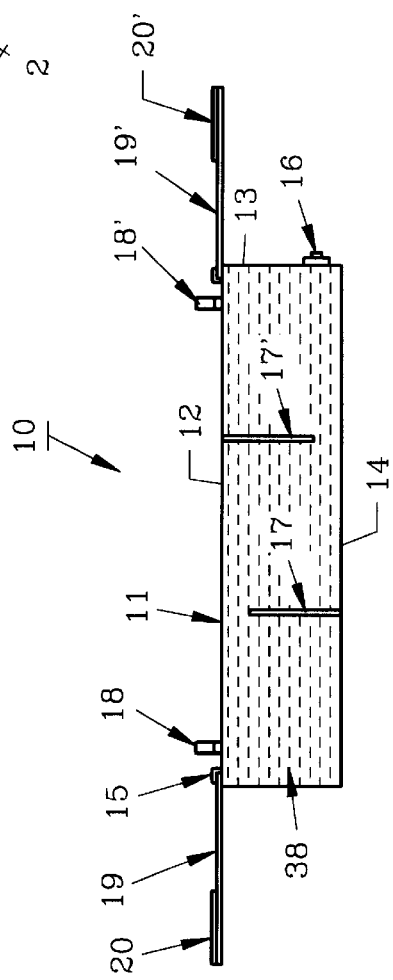

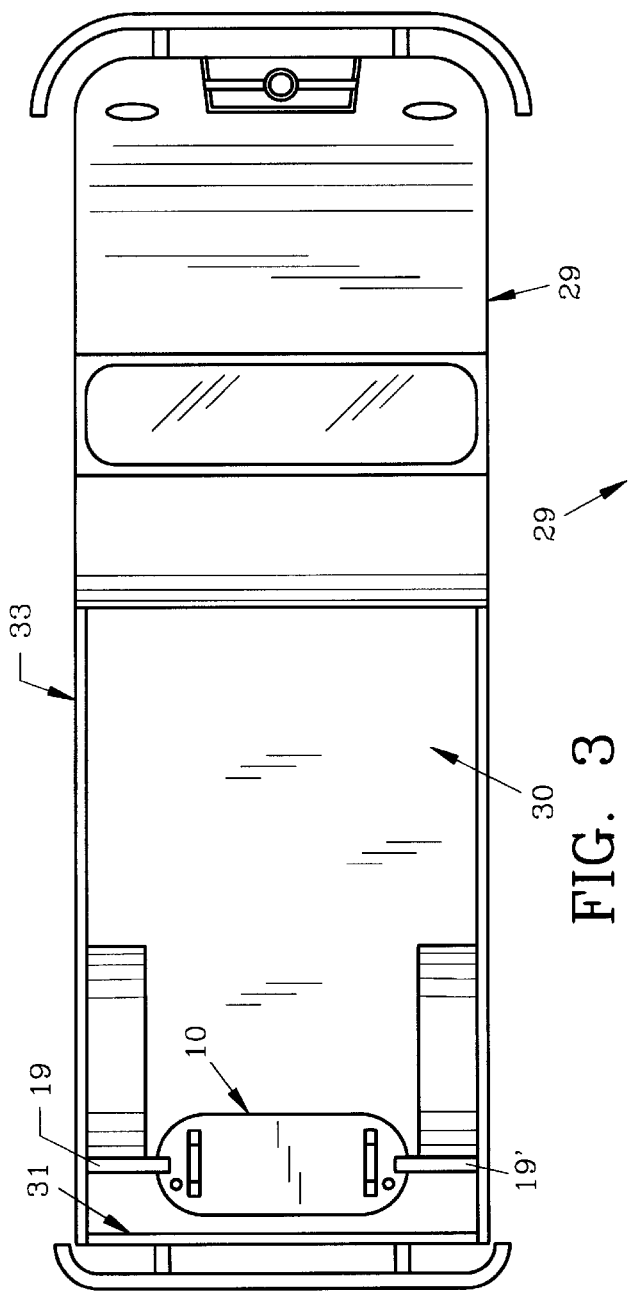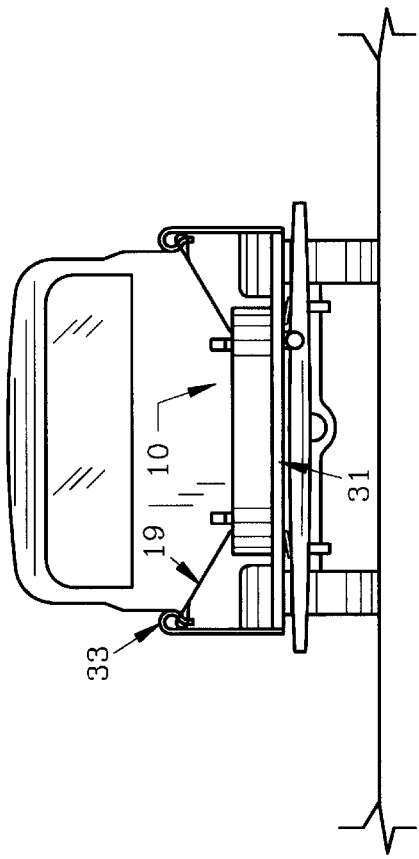

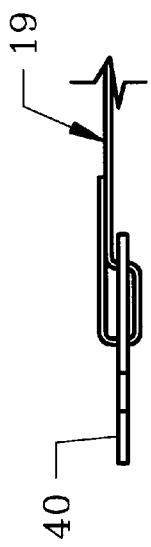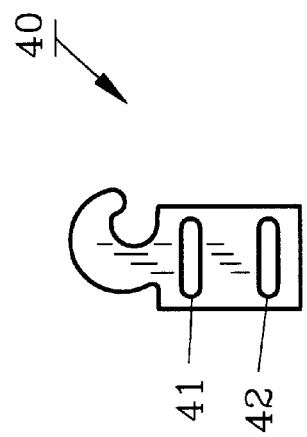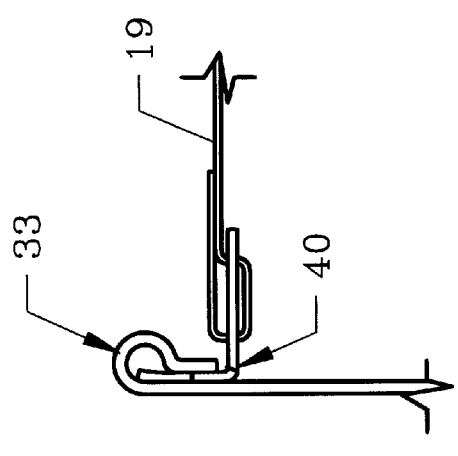

VEHICLE BALLAST RECEPTACLE

BACKGROUND OF THE INVENTION

1. Field Of The Invention

The invention herein pertains to ballast devices to increase the traction of vehicles and in particular pertains to a flexible receptacle which can be filled with water to load the rear wheels of a vehicle, such as a pick-up truck, for traveling over slick, wintery roads.

2. Description Of The Prior Art And Objectives Of The Invention

Vehicle owners, and in particular owners of pick-up trucks have long experienced the need of a simple, efficient way to add weight to the rear wheels of the vehicle when traveling over slick or icy roads. Sandbags, firewood and other articles have been placed in the beds of pick-up trucks and vans to increase the load on the rear wheels for increased traction and steering performance while navigating icy streets and roads.

U.S. Pat. No. 3,727,971 provides boxes along the sides of the vehicle bed for containment of tools and fluids to increase the load for better traction. Another type of vehicle ballast is shown in U.S. Pat. No. 5,494,315, in which apparatus is mounted along each side of a truck bed, over the rear wheels for containing sand or other heavy substances. U.S. Pat. No. 4,190,281 also provides a ballast device for pick-up trucks which includes side-mounted containers for carrying sand.

While all such prior art devices are beneficial to some degree various disadvantages persist, such as convenience in use, costs and installation considerations. Thus, with these and other problems and liabilities of prior art devices, it is an objective of the present invention to provide a ballast receptacle for a vehicle which can be easily mounted or removed from the vehicle without tools or equipment.

It is another objective of the present invention to provide a ballast receptacle which is formed from a relatively lightweight flexible plastic material for containing ballast such as water to load the rear wheels of the vehicle and which will collapse when empty for convenient storage.

It is still another objective of the present invention to provide a ballast receptacle which can be easily filled while on the vehicle with water or drained without the necessity of removing the ballast receptacle from the vehicle.

It is yet another objective of the present invention to provide a ballast receptacle which is relatively inexpensive to manufacture and purchase and which is light in weight when empty.

Various other objectives and advantages of the present invention will become apparent to those skilled in the art as a more detailed description is set forth below.

SUMMARY OF THE INVENTION

The aforesaid and other objectives are realized by providing a ballast receptacle formed from a vinyl material which will contain water or other suitable materials for weight purposes. The ballast receptacle is mounted laterally across the rear of the vehicle bed, such as for a pick-up truck, and is affixed by anchoring straps to each side of the vehicle such as to the bed side walls of the pick-up truck. The bottom of the receptacle is flat to assist in stabilizing the receptacle during transportation and the container portion of the receptacle includes a pair of baffles to retard liquid or other ballast movement within.

BRIEF DESCRIPTION OF THE DRAWINGS

FIG. 1 demonstrates the preferred form of the ballast device of the invention in a top perspective view;

FIG. 2 provides a side elevational view of the device as shown in FIG. 1, along lines 2—2 and filled with water;

FIG. 3 illustrates a top plan view of a typical pick-up truck having the ballast receptacle as shown in FIG. 1 mounted at the rear of the truck bed;

FIG. 4 depicts an enlarged close-up view of the attachment of the ballast receptacle to the truck bed side wall;

FIG. 5 shows a rear elevational view of the pick-up truck as seen in FIG. 3 with the ballast receptacle therein;

FIG. 6 features a plastic hook for use in attaching the connection to the flexible strap;

FIG. 7 illustrates the hook of FIG. 6 positioned on a flexible strap; and

FIG. 8 depicts the hook and strap of FIG. 7 fastened to the truck bed side wall.

DETAILED DESCRIPTION OF THE PREFERRED EMBODIMENT AND OPERATION OF THE INVENTION

For a better understanding of the invention, turning now to the drawings, FIG. 1 illustrates preferred vehicle ballast receptacle 10 consisting of container 11 formed from flexible, transparent polyvinyl chloride sheeting having a top 12, side walls 13 and a flat bottom 14. A pair of sealed inlets 15, 15' are positioned on top 12 and drain outlet 16 also closed, is shown at one end thereof in side wall 13. Positioned internally of container 11 are a pair of baffles 17, 17' as also seen in FIG. 2. Baffles 17, 17' prevent undue motion of fluid within container 11, such as water 38 as, for example, when ballast receptacle 10 is transported over rough roads or terrain. Baffles 17, 17' are formed from polyvinyl chloride material also.

Handles 18, 18' are attached by heat welding or the like to top 12 of container 11. Flexible straps 19, 19' formed from nylon fabric act as means to anchor vehicle ballast receptacle 10 within a pick-up truck or other vehicle. At the terminal ends of flexible straps 19, 19' are hook and loop materials 20, 20' which facilitate anchoring ballast receptacle 10 to the vehicle side walls, as further explained below.

Vehicle ballast receptacle 10, the preferred embodiment, has a length of approximately 46" (116.8 cm), a height of 14" (35.6 cm) and a depth of approximately 13" (33 cm), for holding approximately 30.1 gallons (114 liters) of water 38, the preferred ballast. The preferred material for forming ballast receptacle 10 is a transparent polyvinyl chloride of suitable thickness to be durable, yet flexible. As ballast receptacle 10 is often used in freezing weather, it has been found that polyvinyl chloride will expand when water 38 freezes and not crack, even at very low temperatures at which water 38, when frozen, expands. Various other suitable, flexible plastics or other materials may also be used as desired for forming ballast receptacle 10.

In FIG. 3 a top view of ballast receptacle 10 is shown positioned in bed 30 of standard pick-up truck 29. As seen, ballast receptacle 10 is positioned by flexible anchoring straps 19, 19' laterally of truck bed 30 at the rear thereof and proximate tailgate 31, seen closed in FIG. 3. Straps 19, 19' are formed from nylon or other materials to engage hook and loop materials 20, 20'. In FIG. 4, an enlarged section of anchoring strap 19 is seen passing through truck bed side wall 33. As would be understood, openings 35, 36 are in side wall 33 whereby nylon fabric anchoring strap 19 is directed therethrough and secured by hook and loop material 20 as shown in FIG. 1. In FIG. 5, a rear view of pick-up truck 29 is shown with tailgate 31 in a closed position. Once in place, water 38 or other liquids can be placed in container 11 and transported. Water 38 can be later drained for animal consumption or for other purposes, thus providing multiple uses for ballast receptacle 10.

For transportation along icy or muddy roads, container 11 of ballast receptacle 10 can be filled with water 38 through inlets 15, 15'. The added weight of ballast receptacle 10 when filled with water will greatly load the rear vehicle tires of pick-up truck 29 while allowing truck bed 30 to be substantially free for hauling desired cargo. As shown in FIG. 3, the majority of truck bed 30 is unobstructed even with vehicle ballast receptacle 10 in place, due to it size and positioning.

As an alternate means of anchoring vehicle ballast receptacle 10, flexible strap 19 is seen in FIG. 7 connected to plastic hook 40, seen in FIG. 6. Hook 40 is made of a suitable, durable, bendable plastic such as polypropylene or other polymeric material and allows strap 19 to pass through openings 41, 42. Hook 40 can be attached to openings or slots in a vehicle side wall, such as slots 35, 36 as shown in FIG. 4 or can be frictionally engaged within truck side wall 33 as shown in FIG. 8. Hook 40 may have an overall length of approximately 5–7½ centimeters, a width of 3–4 centimeters and a thickness of approximately 3–4 millimeters.

The illustrations and examples provided herein are for explanatory purposes and are not intended to limit the scope of the appended claims, as those skilled in the art will make modifications to the invention for particular vehicle sizes and types and road conditions.

I claim:

1. A ballast receptacle for laterally positioning in a vehicle to stabilize the vehicle while on slick surfaces such as ice, the receptacle comprising:

a flexible, selectively collapsible, liquid impermeable container, said container comprising a flat bottom, said flat bottom for stabilizing said container within the vehicle, said container formed from polyvinyl chloride, said container defining a fluid inlet;

means to anchor said container within the vehicle, said anchoring means affixed to said container, said anchoring means comprising a pair of flexible straps, each of said flexible straps including a hook and loop material;

a baffle, said baffle positioned within said container; and a handle, said handle attached to said container.

2. A ballast receptacle in combination with a pick-up truck bed, said pick-up truck bed comprising:

a) a bottom, said bottom having a width;

b) a pair of sidewalls, said sidewalls generally perpendicular to said bottom;

c) a tailgate, said tailgate perpendicular to each of said sidewalls and to said bottom; and said ballast receptacle comprising:

a) a flexible, selectively collapsible, liquid impermeable container, said container positioned laterally in said truck bed, said container having a width less than the width of said bottom, said container defining a fluid inlet;

b) a flexible strap, said strap attached to said container and one of said sidewalls to hold said container in position; and c) a baffle, said baffle enclosed within said container.

3. The combination of claim 2 wherein said flexible strap comprises a terminal end.

4. The combination of claim 3 further comprising a hook and loop material, said hook and loop material positioned on said flexible strap.

5. The combination of claim 4 wherein said container comprises a flat bottom, said flat bottom for stabilizing said container in said truck bed.

6. The combination of claim 5 wherein said container has a height, and wherein said baffle extends a distance less than the height of said container.

* * * * *